(12) United States Patent
Devillez (10) Patent No.: US 12,338,667 B2
(45) Date of Patent: Jun. 24, 2025

(54) BISTABLE MECHANISM FOR AN AIRCRAFT DOOR

(71) Applicant: LATECOERE, Toulouse (FR)

(72) Inventor: Sebastien Devillez, Saint Jean (FR)

(73) Assignee: LATECOERE, Toulouse (FR)

( * ) Notice: Subject to any disclaimer, the term of this patent is extended or adjusted under 35 U.S.C. 154(b) by 157 days.

(21) Appl. No.: 18/003,323

(22) PCT Filed: Jun. 27, 2021

(86) PCT No.: PCT/EP2021/067596
§ 371 (c)(1),
(2) Date: Dec. 26, 2022

(87) PCT Pub. No.: WO2022/002804
PCT Pub. Date: Jan. 6, 2022

(65) Prior Publication Data
US 2023/0258033 A1 Aug. 17, 2023

(30) Foreign Application Priority Data
Jun. 30, 2020 (FR) ...................................... 2006882

(51) Int. Cl.
*E05D 11/10* (2006.01)
*B64C 1/14* (2006.01)
(52) U.S. Cl.
CPC .......... *E05D 11/105* (2013.01); *B64C 1/1407* (2013.01)

(58) Field of Classification Search
CPC ..... B64C 1/1423; B64C 1/1407; B64C 1/143; B64C 1/1438; E05D 11/105
See application file for complete search history.

(56) References Cited

U.S. PATENT DOCUMENTS

| 3,581,440 | A | * | 6/1971 | McKinney | .............. B24B 31/10 451/36 |
| 4,659,071 | A | * | 4/1987 | Woltron | .................. B29C 70/86 156/169 |

FOREIGN PATENT DOCUMENTS

| DE | 10134400 | | 1/2003 | | |
| DE | 10134400 | A1 * | 1/2003 | ......... | E05D 11/1014 |
| WO | WO2019211347 | | 11/2019 | | |
| WO | WO2019211349 | | 11/2019 | | |

* cited by examiner

*Primary Examiner* — Gregory Robert Weber
(74) *Attorney, Agent, or Firm* — Defillo & Associates, Inc.; Evelyn A. Defillo (57) ABSTRACT

Aircraft door designed to assume a first configuration and a second configuration, having a bistable mechanism biasing the aircraft door towards either the first or second configuration, the bistable mechanism including: a first yoke having a base attached to the first member and a first pivot rotatably mounted on the base; a second yoke having: a base attached to the first member; a lever a first end of which is mounted so as to pivot on the base; a second pivot mounted so as to rotate on the second end of the lever; a coupling device for coupling the lever to the second member of the door; an arch which can be elastically deformed by bending and a first end of which is attached to the first pivot and a second end attached to the second pivot.

11 Claims, 5 Drawing Sheets

BISTABLE MECHANISM FOR AN AIRCRAFT DOOR

CROSS REFERENCE TO RELATED APPLICATION

This application is a national stage entry of PCT/EP2021/067596 filed Jun. 27, 2021, under the International Convention and claiming priority over French Patent Application No. FR2006882 filed Jun. 30, 2020.

TECHNICAL FIELD

The invention relates to the field of aeronautics and is more particularly aimed at aircraft doors designed to assume different configurations and to be held in these configurations by bistable mechanisms.

PRIOR ART

Aircraft doors are commonly designed to assume different configurations comprising two stable states and to call upon a bistable mechanism that allows the door to assume one or the other of these configurations, while preventing the door from remaining in an unplanned configuration.

For example, an aircraft door may have a closed configuration and an open configuration and may comprise a bistable mechanism which, when the door is released in a position that is intermediate between the open configuration and the closed configuration, drives the door toward the open configuration or toward the closed configuration. No stable position outside of the open configuration and of the closed configuration is permitted.

According to another example, aircraft doors generally comprise levers for maneuvering the door, for locking it, or else for activating or deactivating safety mechanisms of the door. An aircraft door may, for example, comprise a longitudinal shaft, turned by a lever, operating locking stops. Such an aircraft door has a locked first configuration in which a lever is in a locked position, and an unlocked second configuration in which the lever is in an unlocked position. The aircraft door may comprise a bistable mechanism that allows the lever to assume one or the other of the two authorized positions (locked or unlocked) and which prevents any intermediate stable position of the lever. When the lever is released outside of one of these stable positions, it switches over toward one or the other of these stable locked or unlocked positions according to the position it was in when released.

The bistable mechanisms therefore perform a function relating to the safety of operation of the door or of mechanisms supported by the door, and thus ensure the security of the aircraft.

In the field of aeronautics, bistable mechanisms are generally achieved using a spring-loaded rod. A spring-loaded rod is an actuating cylinder consisting of two tubes pushed together coaxially and designed to slide one inside the other against the action of a spring. One of the mobile elements of the aircraft door is then connected to one of the ends of this spring-loaded rod, while another mobile element of the door is connected to the second end of the spring-loaded rod. When this second element of the door is moved, the spring-loaded rod works in compression, until it reaches a switchover position beyond which the spring-loaded rod works in extension. When the second element is released before the switchover point is reached, the spring-loaded rod returns it to its stable initial position corresponding to the first configuration of the door. When the second element is released after the switchover point has been passed, the spring-loaded rod pushes the second element back toward its second stable position corresponding to the second configuration of the door.

This type of solution employing bistable mechanisms in aircraft doors is commonly used in the aeronautical industry and meets the set objectives of reliability and safety. However, the existing bistable mechanisms in aircraft doors are relatively complex mechanisms based on the sliding of components relative to one another, thereby entailing suitable mechanical adjustments. In addition, these bistable mechanisms use costly mechanical construction elements such as ball joints, linear guides, etc. In addition, assembling a certain number of components takes time and organization in the manufacture of the aircraft door.

The known mechanisms are thus costly in terms of components and in terms of production costs, and additionally represent a not inconsiderable mass within the aircraft door. Requirements relating to set-up and maintenance in general are also incurred through the use of such bistable mechanisms in aircraft doors.

Documents WO2019/211347 and DE10134400 moreover describe other bistable mechanisms.

SUMMARY OF THE INVENTION

It is an object of the invention to improve the aircraft doors of the prior art.

To that end, the invention is aimed at an aircraft door designed to assume a first configuration in which a first element of the door assumes a first position with respect to a second element of the door, and a second configuration in which the first element assumes a second position with respect to the second element, this aircraft door comprising a bistable mechanism urging the aircraft door toward one or the other of the first and second configurations. The bistable mechanism comprises:
  a first end-fitting comprising a first base fixed to the first element and a first pivot mounted with the ability to rotate on the first base;
  a second end-fitting comprising: a second base fixed to the first element; a lever, of which a first end is mounted with the ability to pivot on the second base; a second pivot mounted with the ability to rotate on the second end of the lever; a coupling means for coupling the lever to the second element of the door;
  a bow that is elastically deformable in bending and of which a first end is fixed to
  the first pivot and of which a second end is fixed to the second pivot.

The expression "aircraft door" is used here in a broad sense, i.e. that it refers to any opening and closing system used in an aircraft, such as, for example: a passenger door; an emergency exit; the door to a hold; a landing gear hatch; or any other element that opens relative to the aircraft fuselage and which is designed to assume at least two configurations.

The aircraft door consists of an opening panel and of a fixed frame (the door frame to which the opening panel locks), and also of all the safety mechanisms generally associated with the door in an aircraft, such as, for example: emergency mechanisms, opening-closing mechanisms, unlocking-locking mechanisms, mechanisms for arming and disabling the escape slide, etc.

The bistable mechanism proposed allows the construction of an aircraft door comprising, for this function, elements that are extremely simplified and lightweight in comparison with the prior art. No complex mechanical element is employed in the bistable mechanism. The latter requires very few moving parts and no movement involving linear friction and guidance, thereby making it possible to reduce the instability caused by traditional guideways, in a context in which the torques and the forces generated may be great.

The bistable mechanism is self-aligning and requires for example no ball joint connection. The bow of the bistable mechanism can be produced to work in all directions for the same stress and to make best use of the elastic energy contained within the material. The bow may also work in torsion in order to accommodate misalignment.

The bistable function is thus obtained within the aircraft door at a lowered cost and with greater reliability. The increase in reliability is notably due to the non-existence of the weak points encountered for example in the prior art at the junctions between springs and other mechanical elements, with significant friction and stress-concentration phenomena.

The aircraft door thus equipped may be produced predominantly from composite materials, which may be an advantage for certain aircraft. The bistable mechanism is suited to the use of composite materials, particularly in the bow which may advantageously be made from composite materials that provide the desired elasticity, or to the use of any other technical material employed in aeronautical engineering.

The aircraft door according to the invention may comprise the following additional features, alone or in combination:
- the means for coupling the lever to the second element of the door comprises a
- means for rotationally coupling the lever and the second element of the door;
- the means for coupling the lever to the second element of the door comprises a rotational-driving feature centered on the axis of rotation of the lever with respect to the second base;
- the bow is elastically deformed and urges the first pivot and the second pivot toward one another;
- the lever is: in a first angular position when the aircraft door is in the first configuration; in a second angular position when the aircraft door is in the second configuration;
- the bow passes around the second base when the aircraft door is in the second configuration;
- the bistable mechanism has an unstable switchover position in which the axis of rotation of the first pivot, the axis of rotation of the lever on the second base, and the axis of rotation of the second pivot are aligned;
- in the unstable switchover position, the lever is positioned between the two ends of the bow;
- the bow is made of a laminated composite material;
- the bow has a constant width;
- the bow has a variable width which is greater in a central portion of the bow than at the ends thereof;
- the bow has a variable thickness that is greater in a central portion of the bow than at the ends thereof;
- the bistable mechanism comprises a plurality of associated bows;
- between the first configuration and the second configuration, the bow is elastically deformed by moving its ends further apart;
- between the first configuration and the second configuration, the bow is elastically deformed by moving its ends closer together.

PRESENTATION OF THE FIGURES

Other features and advantages of the invention will become apparent from the following non-limiting description, with reference to the attached drawings, in which.

DETAILED DESCRIPTION

Figure 1:
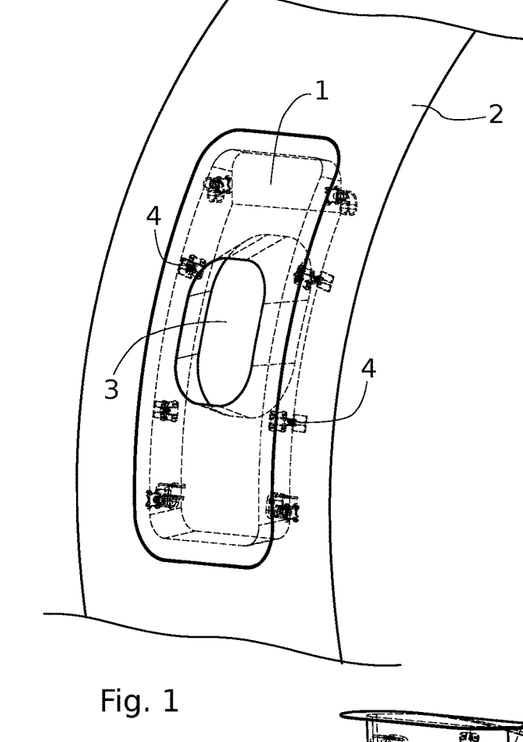
FIG. 1 illustrates an aircraft door according to the invention, in a first configuration.
Figure 2:
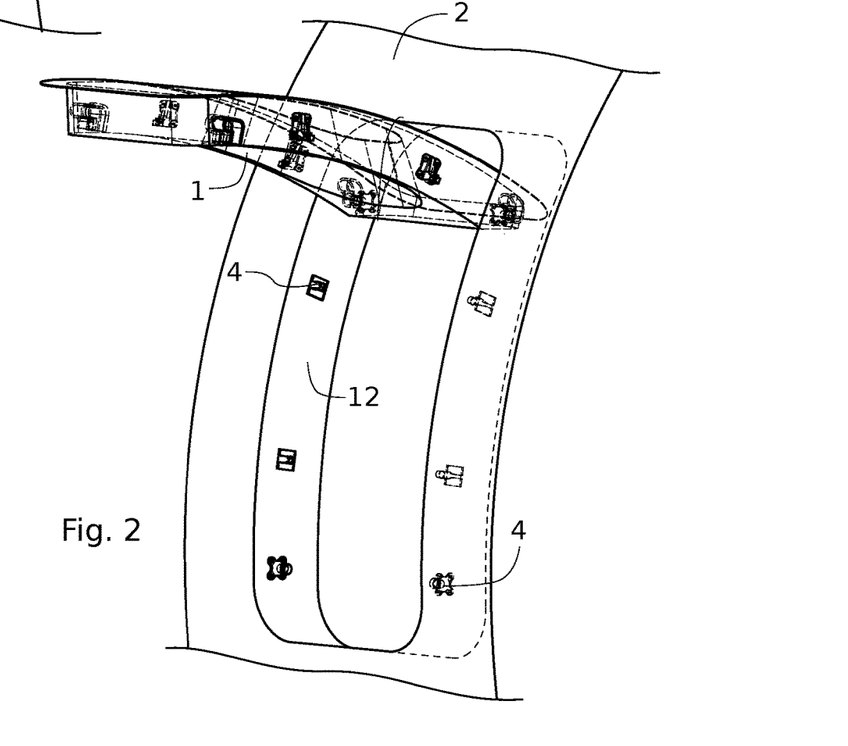
FIG. 2 illustrates the aircraft door in a second configuration.

FIGS. 1 and 2 illustrate one example of an aircraft door according to the invention. The aircraft door comprises an opening panel 1 able to move in rotation with respect to a door frame 12 fixed to the fuselage 2 (in partial view in the figures) of the aircraft.

The aircraft door in this example comprises a window 3 and locking stops 4.

FIGS. 1 and 2 relate to a simple example of a first and second configuration for an aircraft door. In this example, the aircraft door is designed to assume a first configuration which is a closed configuration (FIG. 1) and is designed to assume a second configuration which is an open configuration (FIG. 2).

In this example, starting from the closed configuration depicted in FIG. 1 (first configuration of the door), the door can be opened by unlocking the stops 4 and pushing the opening panel 1 manually outward as far as the open configuration (second configuration of the door, FIG. 2).

The first and second configurations of the aircraft door are positions that are stable thanks to a bistable mechanism that will be described later on. Thus, a user pushes the opening panel 1 back from its open position toward its closed position by applying force against the action of the bistable mechanism as far as a switchover point (approximately midway through the travel of the opening panel 1, for example) and from this switchover point 1 onwards, the door then continues automatically on its way toward its open position, under the effect of the bistable mechanism.

If, during its travel, the opening panel 1 is released:
- before the switchover point, the opening panel 1 returns to its original position;
- after the switchover point, the opening panel 1 moves on to its other stable position.

The aircraft door is therefore unable to assume a stable position between the configurations of FIGS. 1 and 2, and this notably contributes to the safety of the aircraft.

Figure 3:
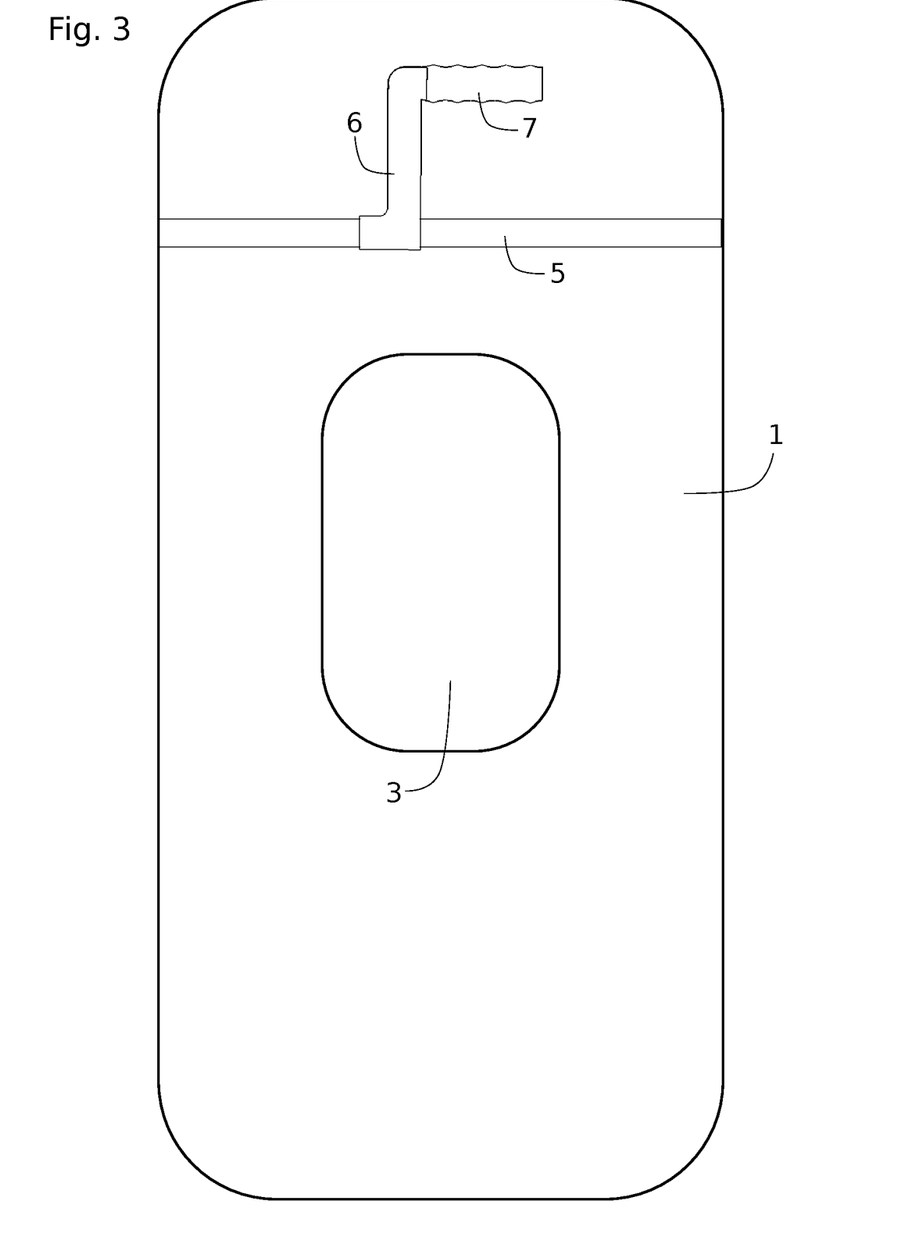
FIG. 3 illustrates another example in which the aircraft door is in a first configuration.
Figure 4:
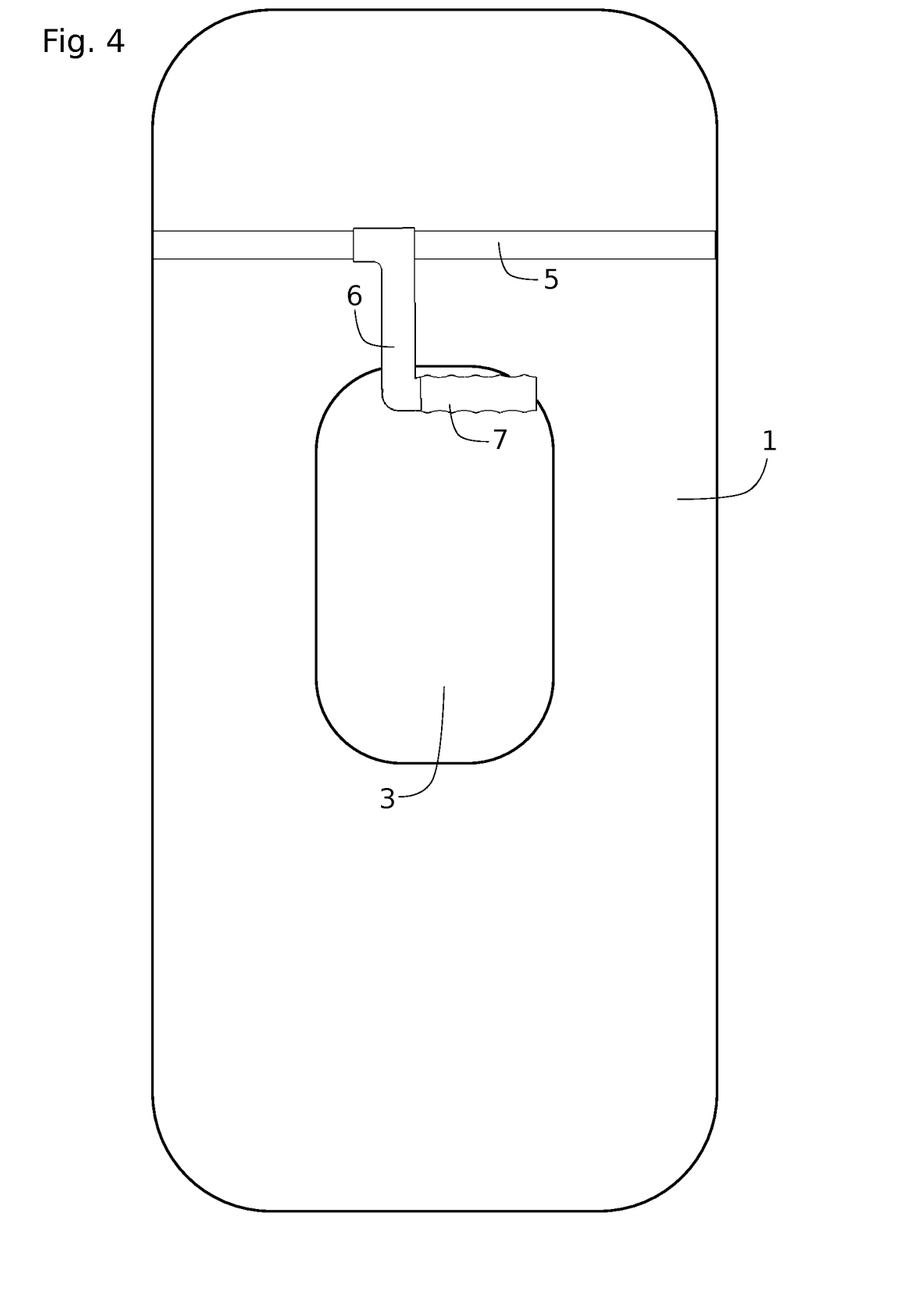
FIG. 4 illustrates the aircraft door of FIG. 3, in a second configuration.

FIGS. 3 and 4 illustrate another example of possible first and second configurations for the aircraft door.

The first and second configurations for the door correspond, in this second example, to a locked configuration and an unlocked configuration.

Actuation of the locking stops 4 within the aircraft door is achieved via a mechanism (not depicted) operated by rotation of a shaft 5. The shaft 5 is able to move between an unlocked angular position and a locked angular position.

A lever 6 equipped at its end with a handle 7 is connected to the shaft 5 and allows the latter to be rotated between its locked and unlocked angular positions.

In FIG. 3, the aircraft door is in its first configuration, which therefore here corresponds to a locked configuration. The lever 6 is lifted up so that the shaft 5 is in its locking angular position. In this angular position, the shaft 5 keeps the locking stops active. This first configuration corresponds to a configuration in which the door is closed and locked, allowing the aircraft to fly.

When the aircraft is on the ground and the door needs to be opened in order to provide access to an internal space of the aircraft, the lever 6 is lowered according to FIG. 4 to drive the rotation of the shaft 5 as far as its unlocked angular position, which releases the stops 4 and allows the door to be opened. The second configuration of the aircraft door, which in this example corresponds to an unlocked configuration, is depicted in FIG. 4.

In order to pass from the (locked) first configuration to the (unlocked) second configuration, a user actuates the lever 6 using the handle 7. A bistable mechanism, described later on, is provided so that the lever 6 and the shaft 5 can assume only stable positions corresponding to these two configurations. If the handle 7 is released during its travel between its positions of FIGS. 3 and 4, the lever 6 and the shaft 5 return to their initial position, or on the other hand are urged toward the other stable position, according to the switchover point of the bistable mechanism.

This second example of first and second configurations of the door, relating to FIGS. 3 and 4, is thus an additional illustration of a bistable configuration, i.e. a configuration restricted to just two stable states for safety reasons. An intermediate position in which the aircraft door is neither locked nor unlocked could in fact pose serious safety problems.

Figure 5:
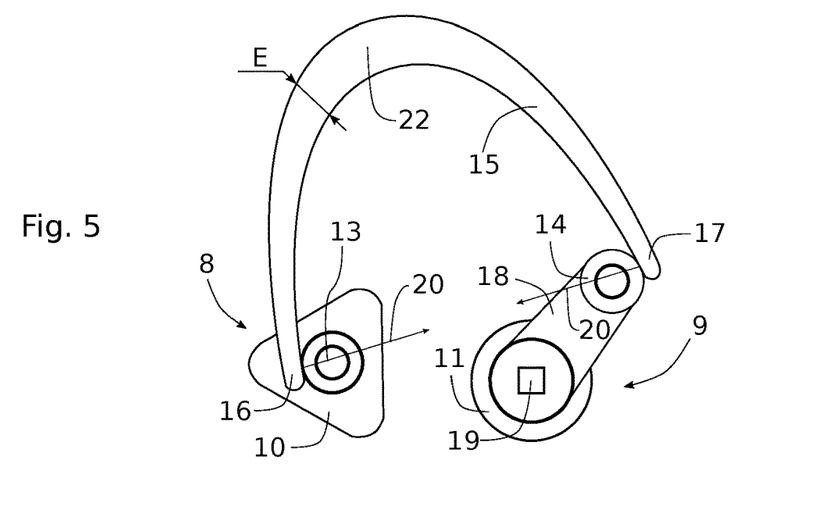
FIG. 5 depicts the bistable mechanism of the aircraft doors of FIGS. 1 to 4, in a first position.
Figure 6:
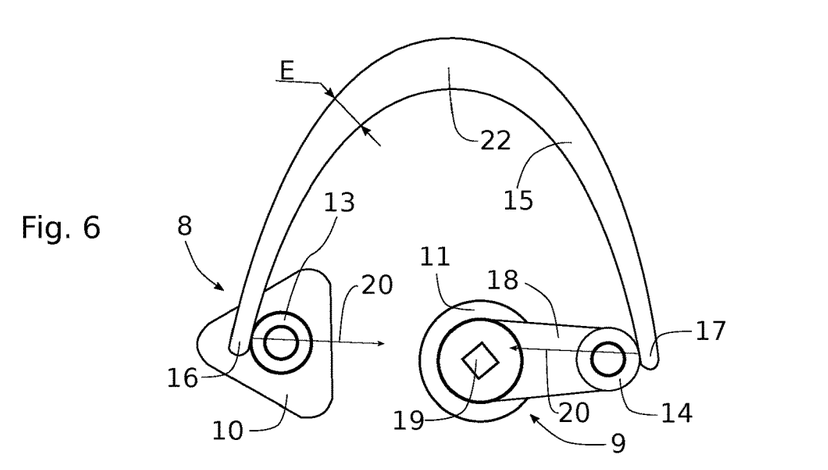
FIG. 6 depicts the bistable mechanism of FIG. 5, in a second position.
Figure 7:
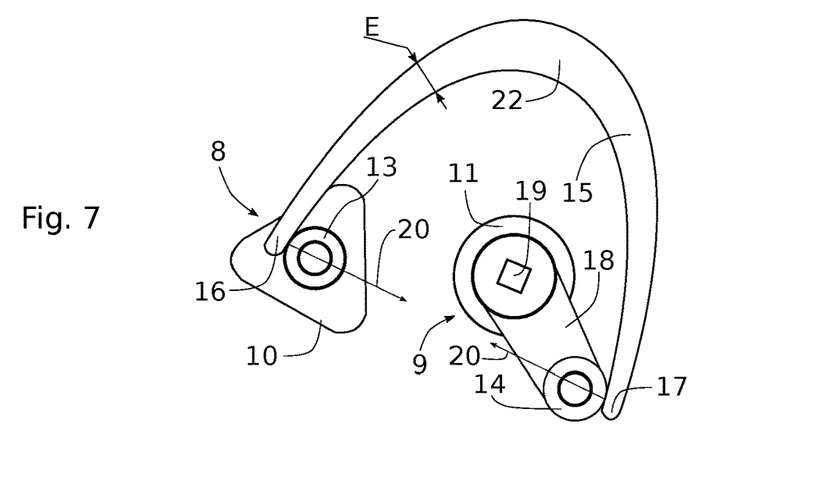
FIG. 7 depicts the bistable mechanism of FIG. 5, in a third position.

FIGS. 5 to 7 illustrate a bistable mechanism designed for an aircraft door according to the invention. Such a bistable mechanism can be employed, with suitable sizing, both in the example of FIGS. 1 and 2 (at the hinges that allow the opening panel 1 to be opened and closed) and in the example of FIGS. 3 and 4 (at the shaft 5 to ensure the bistable state thereof between the locked angular position thereof and the unlocked angular position thereof). Outside of these examples, this bistable mechanism can be used to ensure safety with respect to any element of the aircraft door which affords the door a first and a second configuration.

The bistable mechanism acts between a first element of the door and a second element of the door which are capable of moving one relative to the other and for which a bistable function is required. The bistable mechanism allows a first element and a second element to occupy a stable first mutual relative position, corresponding to a first configuration of the door, and a stable second mutual position, corresponding to a second configuration of the door.

The bistable mechanism in this example comprises a first end-fitting 8 and a second end-fitting 9 which are both mounted on a first element of the door. The first end-fitting 8 comprises a first base 10 and the second end-fitting 9 comprises a second base 11 allowing said fittings to be fixed to the first element of the door.

In the case of the example of first and second configurations relating to FIGS. 1 and 2:

The first element of the door consists of the door frame 12, to which the end-fitting 8 is fixed, and also the end-fitting 9, which is fixed at the level of the door hinge axis;

the second element of the door consists of the opening panel 1, which is able to move relative to the frame 12 about the hinge axis.

In the case of the example of first and second configurations relating to FIGS. 3 and 4:

the first element of the door consists of the opening panel 1, the end-fittings 8, 9 being fixed to the opening panel 1, near the shaft 5. The end-fitting 9 corresponds to the bearing of the shaft 5;

the second element of the door consists of the shaft 5 which is able to move in rotation relative to the opening panel 1 between its two angular positions.

The first base 10 and the second base 11 may be mounted directly on the first element or on a common component which is itself fixed to the first element, or may both be produced as a single piece which is then fixed to the first element.

The first end-fitting 8 additionally comprises a first pivot 13 mounted on the first base 10. The pivot 13 allows a component to be attached in a pivoting connection with the base 10.

The second end-fitting 9 comprises a lever 18 mounted with the ability to rotate on the base 11, for example thanks to a bearing. A second pivot 14 is mounted at the end of the lever 18 and allows the attachment of a component in a pivoting connection with the end of the lever 18.

The pivots 13, 14 consist for example of a rolling-contact bearing or of a plain bearing. The ends 16, 17 of the bow are fixed by any means to the pivots 13, 14, for example by screwing the end 13, 14 to the outer ring of a bearing that constitutes the pivot 13, 14.

The bistable mechanism additionally comprises a bow 15, of which one of the ends, 16, is fixed to the first pivot 13 and of which the other end, 17, is fixed to the second pivot 14. The bow 15 is made up of a curved beam, of which the first end 16 is therefore in a pivoting connection with the first base 10 and of which the second end 17 is in a pivoting connection with the end of the lever 18.

The lever 18 additionally comprises a means of coupling with the second element. In this example, this coupling means is a rotational-coupling means indicated schematically by a square driving feature 19 made in the lever 18 and centered on the axis of rotation of the lever 18 with respect to the second base 11. The second element of the door (i.e. the opening panel 1 according to the first example of FIGS. 1 and 2, or the shaft 5 according to the second example of FIGS. 3 and 4) comprises a driving feature that complements the square driving feature 19, so that the rotation of the lever 18 about its axis relative to the second base 11 is rotationally coupled to the second element of the door.

Alternatively, the means for coupling the lever 18 with the second element of the door may be embodied by any other element allowing the direct or indirect rotational driving of the lever 18 via a movement of the second element, thanks to any coupling means such as for example pinions, chains, cams, etc.

The lever 18 is:
  in a first angular position (FIG. 5) when the aircraft door is in the first configuration;
  in a second angular position (FIG. 7) when the aircraft door is in the second configuration.

FIG. 5 illustrates a first stable position of the bistable device corresponding to the first configuration of the aircraft door. According to the example of FIGS. 1 and 2, the first configuration corresponds to a closed state of the door and the lever 18 is in an angular position corresponding to the closed position of the opening panel 1. According to the example of FIGS. 3 and 4, the first configuration corresponds to a locked state of the shaft 5 and the lever 18 is in an angular position corresponding to the locked angular position of the shaft 5.

Starting from position of the bistable mechanism of FIG. 5, the aircraft door can be brought toward its second configuration by action on the second element of the door (the opening panel 1 or the shaft 5 according to the two aforementioned examples), causing the lever 18 to be rotationally driven by the square driving feature 19 toward a second angular position corresponding to FIG. 7.

In FIG. 7, the bistable mechanism is in its second stable position which corresponds to the second configuration of the aircraft door. In this second configuration, the opening panel 1 is in the open position in the example of FIGS. 1 and 2, or the shaft 5 is in the unlocked angular position according to the example of FIGS. 3 and 4. With the mechanism in this position, the bow 15 passes around the second base 11.

The positions of the bistable mechanism of FIGS. 5 and 7 are rendered stable through the action of the bow 15 which is positioned between the two pivots 13, 14, having been elastically deformed to widen it. The bow 15 permanently applies to the pivots 13, 14 a force, indicated schematically in the figures by the arrows 20, that tends to move the pivots 13, 14 closer together. In the stable positions of FIGS. 5 and 7, the two pivots 13, 14 are urged toward one another, whereas the lever 18 is immobilized by an end-of-travel stop (not depicted) or simply due to the fact that the second door element of the door, to which element it is coupled, is itself at the end of its travel.

During the angular travel of the lever 18 allowing it to pass from the position of FIG. 5 to the position of FIG. 7, or vice versa, the second pivot 14 moves away from the first pivot 13, increasing the elastic deformation of the bow 15 as far as a culminating point illustrated in FIG. 6 and corresponding to the switchover point. Once past this switchover point of FIG. 6, the bow 15 then accompanies the rotation of the lever 18 and the aircraft door then passes into the other configuration.

In the unstable switchover position of FIG. 6, the axis of rotation of the first pivot 13, the axis of rotation of the lever 18 on the second base 11, and the axis of rotation of the second pivot 14 are aligned, the lever 18 being positioned between the two ends 16, 17 of the bow 15. The unstable switchover position corresponds to a position in which the straight line passing through the center of the pivots 13, 14 also passes through the center of the driving feature 19, i.e. through the axis of rotation of the lever 18 on the base 11 (in the example of FIGS. 1 and 2, the center of the axis 19 corresponds to the hinge axis of the door).

The bow 15 may be made from any material, of which the mechanical, notably elastic, properties are suitable for this application. The bow 15 may for example be machined or cast in a metal or a polymer. In another, preferred, embodiment, the bow 15 is produced of a laminated composite material comprising a leaved reinforcement (for example glass fiber/epoxy or carbon fiber/epoxy), making it possible to combine lightness of weight with suitable elastic properties for the bow 15.

In FIGS. 5 to 7, the bow 15 has been elastically deformed in bending, its two ends 16, 17 having been moved further apart by the action of the lever 18 or, on the other hand, having been brought closer together through action on the lever 18. The bow 15 may comprise a central portion 22 of greater thickness, promoting its elastic behavior. The thickness of the bow 15 here refers to its dimension denoted E in FIGS. 5 to 7.

The elastic properties of such a bow 15 made from a composite material are also highly configurable during the design phase (the thickness of the bow 15, the number of layers of material making up the core of the composite, etc.) in order to obtain forces compatible with the mass of the second element of the door.

Moreover, the bow 15 is dimensioned to work in torsion because the bistable mechanism does not require elements to compensate for the misalignment of the end-fittings 8, 9 (the bases 10, 11 may for example not lie strictly in the same plane). Twisting of the bow 15 allows the bistable mechanism to operate without parasitic loadings and without jamming, and without the need to resort to ball joints.

Figure 8:
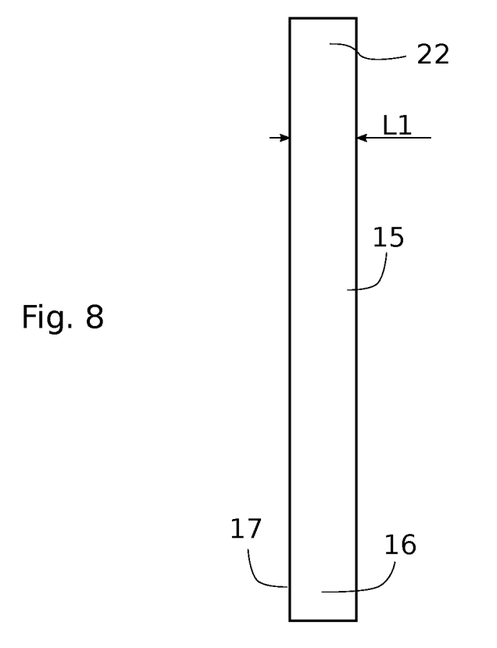
FIG. 8 depicts the bow of the bistable mechanism of FIGS. 5 to 7, viewed in profile.

FIG. 8 is a profile view of the bow 15. In this example, the bow 15 has a width L1 that is constant from the first end 16 as far as the second end 17, passing through the central portion 22 of the bow 15.

Figure 9:
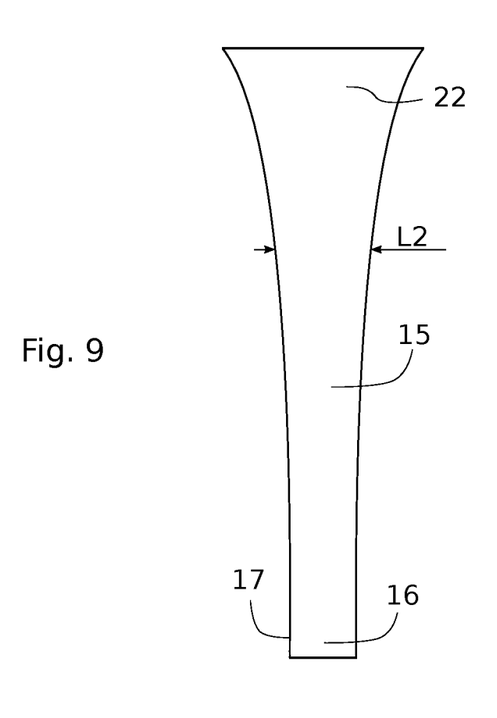
FIG. 9 is a view similar to FIG. 8, for a variant of the bow of the bistable mechanism.

FIG. 9 is a view similar to FIG. 8 illustrating a variant embodiment of the bow 15 in which the width L2 of the bow 15 is now variable, and increases with increasing distance away from the first end 16 as far as a maximum value in the central portion 22, and then decreases again toward the second end 17. This configuration allows a greater width L2 at the central portion 22 of the bow 15 than at its ends 16, 17. The stiffness curve for the bow 15 can thus be modified as desired, according to the elements of the aircraft door to which the bistable mechanism is applied, by modifying the width L2 of the bow 15.

Other variants in the geometry of the bow 15 may of course be envisioned in order to adapt the mechanical properties, and particularly the elastic properties, of the bow 15 to specific first and second door elements.

Variant embodiments of the aircraft door may be envisioned. For example, the first element and the second element, which are able to move one relative to the other, may be any mobile element of the aircraft door and the equipment thereof, other than those described by way of example.

Moreover, the examples described relate to the scenario in which the bow 15 is elastically deformed by moving its ends further apart. In a variant, the bow may be deformed by moving its ends closer together. For example, starting from the position of FIG. 5, the lever 18 may be turned in the counterclockwise direction, bringing the ends 16, 17 further together, as far as an unstable switchover position before passing to the position of FIG. 7.

Moreover, at least one bow 15 is needed for the operation of the bistable mechanism, but the latter may nevertheless comprise several bows associated with one another. For example, two bows facing one another with their respective ends fixed to the pivots 13, 14 may be used together.

The invention claimed is:

1. An aircraft door designed to assume a first configuration in which a first element of the door assumes a first position with respect to a second element of the door, and a second configuration in which the first element assumes a second position with respect to the second element, the aircraft door comprising:
   a bistable mechanism urging the aircraft door toward one or the other of the first and the second configurations, the bistable mechanism comprises:
   a first end-fitting (8) comprising a first base (10) fixed to the first element and a first pivot (13) mounted with the ability to rotate on the first base (10);

a second end-fitting (9) comprising: a second base (11) fixed to the first element; a lever (18), of which a first end is mounted with the ability to pivot on the second base (11);

a second pivot (14) mounted with the ability to rotate on the second end of the lever (18); a coupling device for coupling the lever (18) to the second element of the door, the coupling device comprising a rotational-driving device (19) centered on an axis of rotation of the lever (18) with respect to the second base (11);

at least one bow (15) that is elastically deformable in bending and of which a first end (16) is fixed to the first pivot (13) and of which a second end (17) is fixed to the second pivot (14);

wherein the bistable mechanism has an unstable switchover position in which an axis of rotation of the first pivot (13), the axis of rotation of the lever (18) on the second base (11), and an axis of rotation of the second pivot (14) are aligned; and wherein in the unstable switchover position, the lever (18) is positioned between the two ends (16, 17) of the bow (15).

2. The aircraft door as claimed in claim 1, wherein the bow (15) is made of a laminated composite material.

3. The aircraft door as claimed in claim 1, wherein the bow (15) has a constant width (L1).

4. The aircraft door as claimed in claim 1, wherein the bow (15) has a variable width (L2) which is greater in a central portion (22) of the bow (15) than at the ends (16, 17) thereof.

5. The aircraft door as claimed in claim 1, wherein the bow (15) has a variable thickness (E) that is greater in a central portion (22) of the bow (15) than at the ends (16, 17) thereof.

6. The aircraft door as claimed in claim 1, wherein between the first configuration and the second configuration, the bow (15) is elastically deformed by moving its ends (16, 17) further apart.

7. The aircraft door as claimed in claim 1, wherein between the first configuration and the second configuration, the bow (15) is elastically deformed by moving its ends (16, 17) closer together.

8. The aircraft door as claimed in claim 1, wherein the rotational-driving device rotationally couples the lever (18) and the second element of the door.

9. The aircraft door as claimed in claim 1, wherein the bow (15) is elastically deformed and urges the first pivot (13) and the second pivot (14) toward one another.

10. The aircraft door as claimed in claim 1, wherein the lever (18) is:
in a first angular position when the aircraft door is in the first configuration;
in a second angular position when the aircraft door is in the second configuration.

11. The aircraft door as claimed in claim 10, wherein the second end (17) of the bow (15) passes around the second base (11) when the lever (18) pivots toward its second angular position.

* * * * *